(12) United States Patent
Hirsch

(10) Patent No.: US 7,022,207 B2
(45) Date of Patent: Apr. 4, 2006

(54) METHOD AND APPARATUS FOR PEELING A THIN FILM FROM A LINER

(75) Inventor: Donald Ivan Hirsch, Cottage Grove, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 10/959,848

(22) Filed: Oct. 6, 2004

(65) Prior Publication Data

US 2005/0039851 A1    Feb. 24, 2005

Related U.S. Application Data

(62) Division of application No. 10/115,778, filed on Apr. 3, 2002.

(51) Int. Cl.
*B32B 35/00* (2006.01)

(52) U.S. Cl. .................................. 156/344; 156/584

(58) Field of Classification Search ................ 156/344, 156/584
See application file for complete search history.

(56) References Cited

U.S. PATENT DOCUMENTS

| | | | |
|---|---|---|---|
| 2,710,234 A | 6/1955 | Hansen |
| 3,178,041 A | 4/1965 | Wheat et al. |
| 3,285,112 A | 11/1966 | Dale et al. |
| 3,359,046 A | 12/1967 | Dryden |
| 3,380,788 A | 4/1968 | Wilcock |
| 3,477,558 A | 11/1969 | Fleischauer |
| 3,539,177 A | 11/1970 | Schwenk et al. |
| 3,861,259 A | 1/1975 | Hitch |
| 3,946,920 A | 3/1976 | Jordan et al. |
| 4,112,827 A | 9/1978 | Kang |
| 4,143,871 A | 3/1979 | Blessing |
| 4,168,772 A | 9/1979 | Eberle |
| 4,236,814 A | 12/1980 | Tonkin |
| 4,286,467 A | 9/1981 | Köber |
| 4,360,260 A | 11/1982 | Eloranta et al. |
| 4,381,596 A | 5/1983 | Simonton et al. |
| 4,534,549 A | 8/1985 | Eberle |
| 4,591,139 A | 5/1986 | Engelbart |
| 4,668,324 A | 5/1987 | Burns |
| 4,676,862 A | 6/1987 | Kuehnert |

(Continued)

FOREIGN PATENT DOCUMENTS

AT    314 323 B    3/1974

(Continued)

OTHER PUBLICATIONS

U.S. Appl. No. 10/446,485, filed May 28, 2003, Roll-Good Fuel Cell Fabrication Processes, Equipment, and Articles Produced From Same (58669US002, David R. Mekala et al., pp. 1-55, 16 sheets drawings).

(Continued)

*Primary Examiner*—Mark A. Osele
(74) *Attorney, Agent, or Firm*—Philip Y. Dahl

(57) ABSTRACT

A method and apparatus are provided for peeling a thin film, typically 100 microns or less in thickness, from a liner by use of a rotatable peel rod supported in an air bearing. The air bearing comprises a support plate having arcuate surfaces which are substantially coaxial with a cylindrical film-bearing segment of the peel rod. Air openings in the arcuate surfaces conduct a flow of air into an air bearing gap between the arcuate surfaces and the peel rod.

9 Claims, 2 Drawing Sheets

U.S. PATENT DOCUMENTS

| | | |
|---|---|---|
| 4,728,093 A | 3/1988 | Eberle |
| 4,784,380 A | 11/1988 | Eberle |
| 4,819,928 A | 4/1989 | Osborn et al. |
| 4,887,858 A | 12/1989 | Gazzarrini |
| 5,031,002 A | 7/1991 | Yaguchi |
| 5,048,182 A | 9/1991 | Robbins, III |
| 5,061,337 A | 10/1991 | Fraser |
| 5,063,415 A | 11/1991 | Ariyama |
| 5,078,375 A | 1/1992 | Steidinger |
| 5,133,543 A | 7/1992 | Eitel et al. |
| 5,140,872 A | 8/1992 | Holliday et al. |
| 5,200,297 A * | 4/1993 | Kelly ............... 430/253 |
| 5,456,871 A | 10/1995 | Harada et al. |
| 5,556,499 A | 9/1996 | Clough |
| 5,588,967 A | 12/1996 | Lemp et al. |
| 5,596,897 A | 1/1997 | Payne, Jr. et al. |
| 5,761,793 A | 6/1998 | Bevers et al. |
| 5,762,753 A | 6/1998 | Clough |
| 5,783,024 A | 7/1998 | Forkert |
| 5,791,185 A | 8/1998 | Bodnar |
| 5,910,378 A | 6/1999 | Debe et al. |
| 5,989,747 A | 11/1999 | Tanaka et al. |
| 6,007,660 A | 12/1999 | Forkert |
| 6,059,003 A | 5/2000 | Wittkopf |
| 6,066,409 A | 5/2000 | Ronne et al. |
| 6,159,327 A | 12/2000 | Forkert |
| 6,224,203 B1 | 5/2001 | Wotton et al. |
| 6,241,839 B1 | 6/2001 | Yoshino et al. |
| RE37,366 E | 9/2001 | Cox et al. |
| 6,347,585 B1 | 2/2002 | Kiamco et al. |
| 6,405,779 B1 | 6/2002 | Wittkopf |
| 6,419,217 B1 | 7/2002 | Hartmann et al. |
| 6,500,217 B1 | 12/2002 | Starz et al. |
| 6,547,229 B1 | 4/2003 | Hanson et al. |
| 6,585,846 B1 | 7/2003 | Hanson et al. |
| 6,733,912 B1 | 5/2004 | Mlinar |
| 6,740,131 B1 | 5/2004 | Schukar et al. |
| 6,749,713 B1 | 6/2004 | Mlinar |
| 6,756,146 B1 | 6/2004 | Mlinar et al. |
| 6,780,276 B1 | 8/2004 | Ripley |
| 2002/0014509 A1 | 2/2002 | Kitai et al. |
| 2002/0050200 A1 | 5/2002 | Matsumoto et al. |
| 2002/0134501 A1 | 9/2002 | Fan et al. |
| 2002/0136940 A1 | 9/2002 | Mao et al. |
| 2003/0145697 A1 | 8/2003 | Hixon et al. |
| 2003/0188615 A1 | 10/2003 | Ripley |
| 2003/0188616 A1 | 10/2003 | Behymer |
| 2003/0188824 A1 | 10/2003 | Hirsch |
| 2003/0190226 A1 | 10/2003 | Eaton et al. |
| 2003/0191021 A1 | 10/2003 | Ripley et al. |
| 2003/0221311 A1 | 12/2003 | Smith et al. |

FOREIGN PATENT DOCUMENTS

| | | |
|---|---|---|
| BE | 1007774 A3 | 10/1995 |
| DE | 19 28 110 A | 12/1970 |
| DE | 26 10 628 A | 9/1977 |
| DE | 33 43 811 A1 | 6/1985 |
| DE | 94 00 890.6 U1 | 3/1994 |
| DE | 195 48 422 A1 | 9/1997 |
| EP | 0 654 347 A1 | 5/1995 |
| EP | 1 037 295 A1 | 9/2000 |
| EP | 1 473 793 A2 | 11/2004 |
| FR | 2 456 613 A | 12/1980 |
| GB | 1 084 597 A | 9/1967 |
| GB | 2 101 098 A | 1/1983 |
| JP | 55-98040 | 7/1980 |
| JP | 57-93854 | 6/1982 |
| JP | 62-244830 | 10/1987 |
| JP | 03-128851 | 5/1991 |
| JP | 03-128853 | 5/1991 |
| JP | 96335462 A | 12/1996 |
| JP | 10-166014 | 6/1998 |
| JP | 11-273663 A | 10/1999 |
| JP | 11 297314 A | 10/1999 |
| JP | 99292327 A | 10/1999 |
| JP | 2001/236971 | 8/2001 |
| NL | 6 415 053 A | 6/1966 |
| WO | WO 02/43171 A2 | 5/2002 |
| WO | WO 02/43179 A1 | 5/2002 |

OTHER PUBLICATIONS

Monkman, G. J.; "Robot Grippers for Use With Fibrous Materials", *International Journal of Robotics Research*, Sage Science Press, Thousand Oaks, vol. 14, No. 2, Apr. 1, 1995, pp. 144-151.

Ferris, T. L. J., "Design of Two Ultrasonic Distance Measurement System", *The First Japanese-Australian Joint Seminar*, Mar. 16-17, 2000.

* cited by examiner

METHOD AND APPARATUS FOR PEELING A THIN FILM FROM A LINER

CROSS REFERENCE TO RELATED APPLICATION

This application is a divisional of U.S. application Ser. No. 10/115,778, filed Apr. 3, 2002, now allowed, the disclosure of which is herein incorporated by reference.

FIELD OF THE INVENTION

This invention relates to a method and apparatus for peeling a thin film, typically 100 microns or less in thickness, from a liner by use of a rotatable peel rod supported in an air bearing.

BACKGROUND OF THE INVENTION

U.S. Pat. Nos. 5,556,499 and 5,762,753 disclose a peeler-delaminator method and apparatus employing a peel bar supported in a solid bearing that provides continuous bearing contact with the peel bar. The references also describe a peel bar bearing that includes an abrasive surface for continuously scrubbing the peel bar.

SUMMARY OF THE INVENTION

Briefly, the present invention provides an apparatus for removing a film from a liner that includes a rotatable peel rod supported in an air bearing. The air bearing comprises a support plate having arcuate surfaces which are substantially coaxial with a cylindrical film-bearing segment of the peel rod. Air openings in the arcuate surfaces conduct a flow of air into an air bearing gap between the arcuate surfaces and the peel rod.

In another aspect, the present invention provides a method for removing a film from a liner comprising the steps of passing a bilayer of a film and a liner over a rotatable peel rod supported in an air bearing, such that the film contacts the peel rod, and peeling the film from the liner. The film typically has a thickness of 100 microns or less.

What has not been described in the art, and is provided by the present invention, is a method and apparatus that employs a rotatable peel rod supported in an air bearing to peel a delicate or thin film from a liner.

It is an advantage of the present invention to provide a method and apparatus that facilitates the use of rolls of thin cast film in an automated manufacturing process.

DETAILED DESCRIPTION OF PREFERRED EMBODIMENTS

Figure 1:
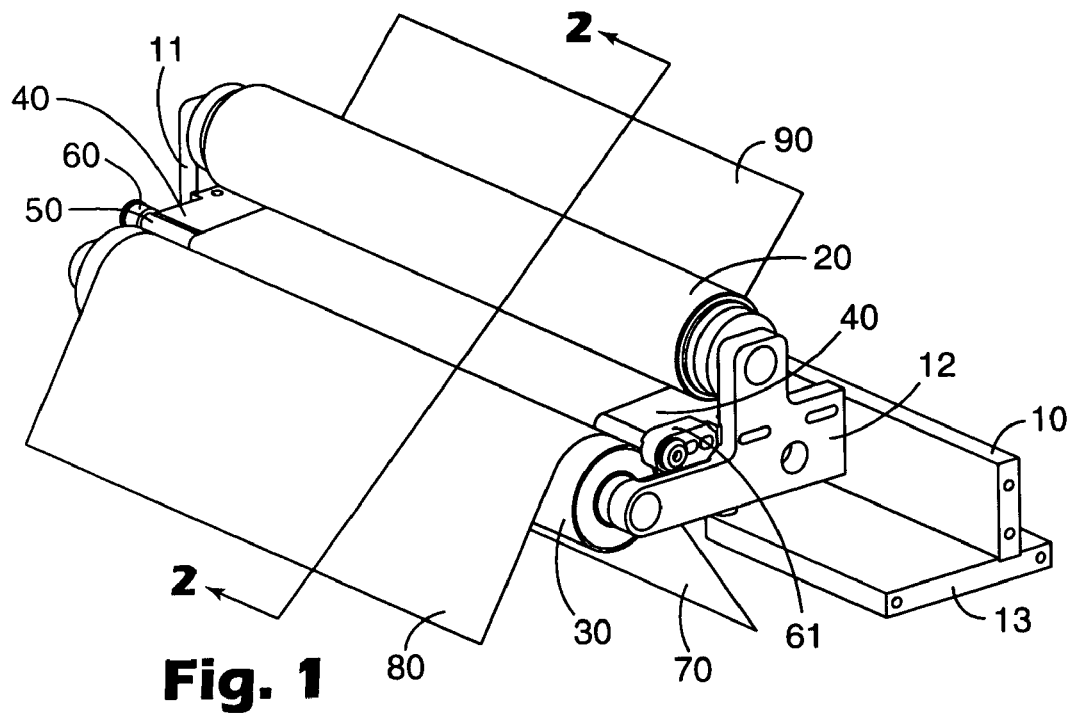
FIG. 1 illustrates a peeling mechanism according to the present invention.
Figure 2:
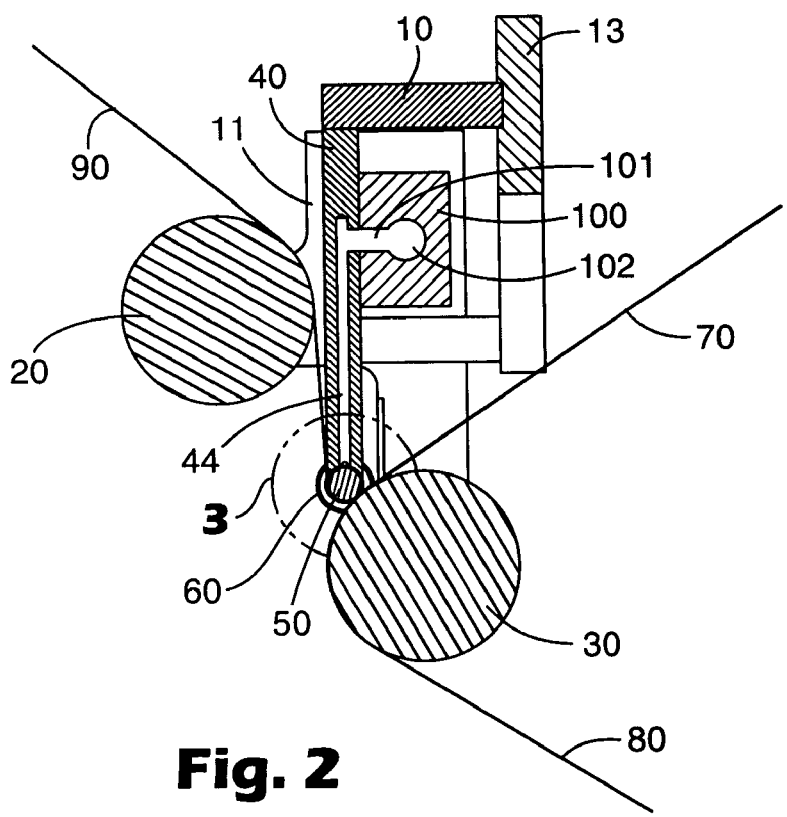
FIG. 2 is a cross-section of the peeling mechanism depicted in FIG. 1.
Figure 3:
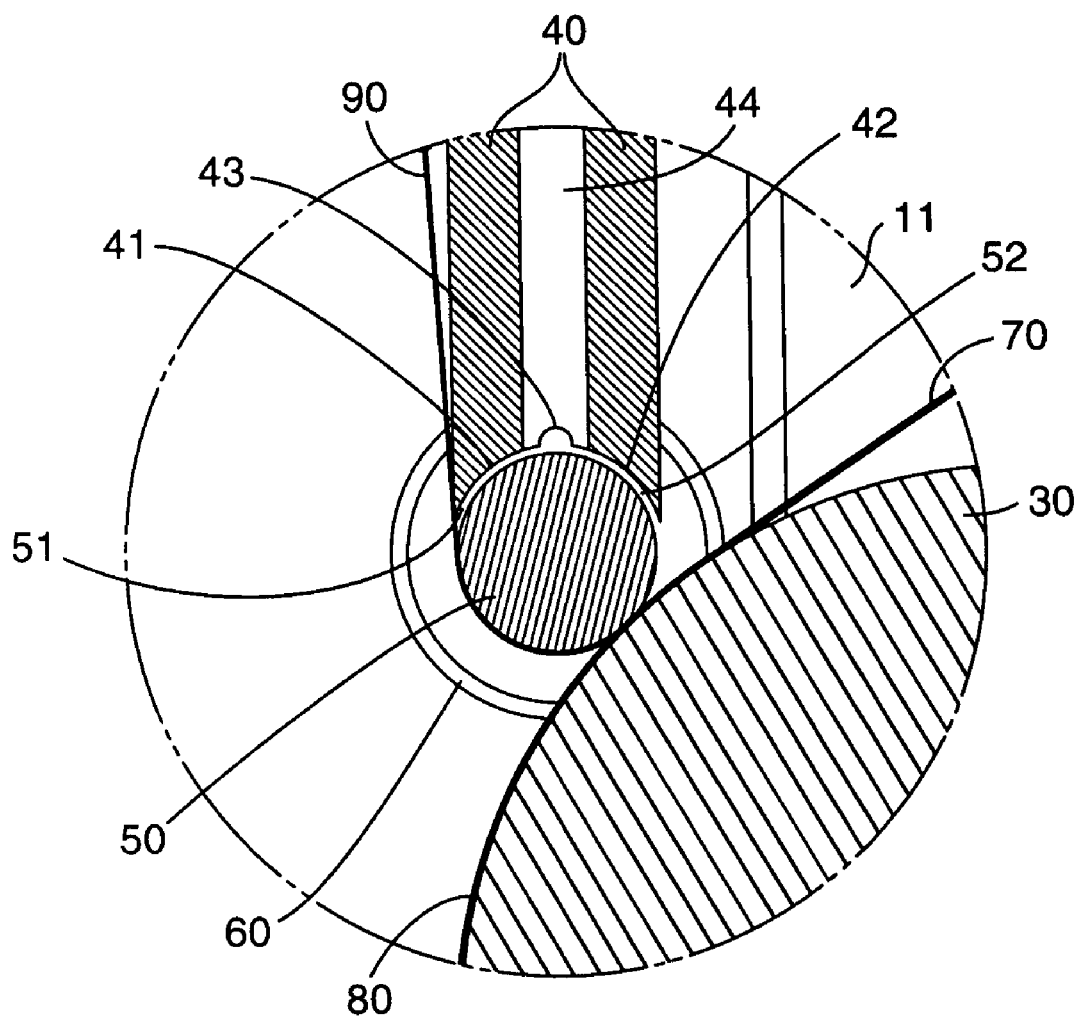
FIG. 3 is a detail of FIG. 2 demonstrating the peel rod according to the present invention.

With reference to FIGS. 1, 2 and 3, a peeling apparatus according to the present invention comprises frame members 10, 11, 12 and 13, which together form a supporting frame. Peel rod support plate 40 is attached to one or more of frame members 10, 11 and 12. Peel rod support plate 40 comprises arcuate surfaces 41 and 42 for receiving peel rod 50. Peel rod 50 is essentially cylindrical in its film-bearing middle segment. Peel rod 50 may be essentially cylindrical throughout it's length, or may have non-cylindrical end segments such as rounded ends or other adaptations for interaction with end caps 60 and 61. End caps 60 and 61 prevent escape of peel rod 50, which might otherwise occur either by transverse motion of peel rod 50, or by the absence of film 90, which might occur, e.g., at the end of a run. End caps 60 and 61 may comprise bearings for each end of peel rod 50, such as a needle bearings. End caps 60 and 61 may be attached to frame members 11 and 12 or to peel rod support plate 40, or to both. Where end caps 60 and 61 comprise bearings for each end of peel rod 50, end caps 60 and 61 may be attached to frame members 11 and 12 or to peel rod support plate 40 by a sliding attachment allowing motion of peel rod 50 closer or farther from air bearing gaps 51 and 52.

The curve of each arcuate surface 41 and 42 is substantially coaxial with the curve of the essentially cylindrical film-bearing middle segment of peel rod 50. In use, air bearing gaps 51 and 52 separate arcuate surfaces 41 and 42 from peel rod 50. Air is driven into air bearing gaps 51 and 52 through air openings, which may comprise a groove 43 separating arcuate surfaces 41 and 42, the groove 43 traversing substantially the entire length of the air bearing gap 51, 52 along the length of the film-bearing segment of peel rod 50. In another embodiment, the air openings might comprise a series of holes. The groove 43 or other air openings are fed by one or more air channels 44, which in turn are fed by air channels 101, 102 in manifold block 100 attached to peel rod support plate 40. Any suitable source of super-ambient air pressure may be used to feed air channels 44, 101, 102, such as an air pump. Any suitable level of air pressure or any suitable air flow rate may be used, provided that a suitable air bearing gap is maintained during operation.

Liner support roller 30 and film idler roll 20 are rotatably attached to frame members 11 and 12. Liner support roller 30 is positioned adjacent to peel rod 50 so as to form a nip. Film idler roll 20 is positioned so as to receive film 90 passing over peel rod 50 and maintain film 90 in a stable orientation relative to peel rod 50.

In operation, a bilayer 70 which comprises a liner 80 bearing a film 90 is directed into the nip formed by liner support roller 30 and peel rod 50. While liner 80 maintains contact with liner support roller 30, film 90 is peeled from liner 80 and follows the surface of peel rod 50. Peel rod 50 rotates as film 90 passes over peel rod 50. Film idler roll 20 receives film 90 passing over peel rod 50 and maintains film 90 in a stable orientation and tension relative to peel rod 50. Typically, the present apparatus is driven by a pulling force applied to a liner 80 by any suitable drive means. In addition, liner support roller 30 may also be driven.

The method according to the present invention is used to advantage with delicate or thin films. Typically, the present method may be used to peel films of 100 micrometers thickness or less, more typically 50 micrometers thickness or less, and more typically 30 micrometers thickness or less. The method according to the present invention may be used to advantage with films of polymer electrolyte membranes that are cast on a liner, including sulfonated fluoropolymer membranes such as Nafion™ or Flemion™. Any suitable liner may be used, including any suitably flexible polymeric sheet materials having a thickness of typically less than 1 millimeter, more typically less than 0.5 millimeter, and more typically less than 0.2 millimeter. Films may be cast from a solution or suspension of the film polymer by any suitable method, including coating or casting methods including bar coating, spray coating, slit coating, brush coating, and the like. Since the cast film may have uneven edges, the cast film may be cut on one or more edges to provide a clean edge. Typically, a continuous web of cast film can be die cut to provide clean side edges using controlled-depth die cutter.

This invention is useful in the manufacture of goods, such as membrane electrode assemblies used in fuel cells, from membranes of polymer electrolytes that are cast on a liner as thin films of 30 micrometer thickness or less.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

I claim:

1. A method for removing a film from a liner comprising the steps of:

passing a bilayer of a film and a liner over a rotatable peel rod supported in an air bearing such that said film contacts said peel rod; and peeling said film from said liner;

wherein said peel rod comprises a film-bearing segment which is essentially cylindrical and has a center axis, and wherein said air bearing comprises a support plate having one or more arcuate surfaces which are substantially coaxial with said film-bearing segment of said peel rod, said support plate comprising one or more air openings in said arcuate surfaces for conducting a flow of air into an air bearing gap between said arcuate surfaces and said film-bearing seament of said peel rod; and wherein said air openings comprise a groove in said arcuate surfaces traversing substantially the entire length of said air bearing gap.

2. The method according to claim 1, wherein said air openings are functionally connected to a source of super-ambient air pressure such that a flow of air into said air bearing gap is provided.

3. The method according to claim 2 wherein said step of passing a bilayer of a film and a liner over a rotatable peel rod comprises passing said bilayer into a nip formed between said peel rod and a liner support roller positioned adjacent to said peel rod.

4. The method according to claim 3, wherein contact is maintained between said liner and said liner support roller during said peeling step.

5. The method according to claim 4 additionally comprising the step of passing said film peeled from said liner over a film idler roll positioned so as to maintain said film in a stable orientation relative to said peel rod during said peeling step.

6. The method according to claim 3 wherein said film has a thickness of 100 micrometers or less.

7. The method according to claim 3 additionally comprising the step of casting said film on said liner.

8. The method according to claim 7 additionally comprising a step of cutting the cast film on one or more edges so as to provide a clean edge prior to removing said film from said liner.

9. The method according to claim 3 wherein said film is a polymer electrolyte membrane.

* * * * *

UNITED STATES PATENT AND TRADEMARK OFFICE
CERTIFICATE OF CORRECTION

PATENT NO.         : 7,022,207 B2                                             Page 1 of 1
APPLICATION NO. : 10/959848
DATED              : April 4, 2006
INVENTOR(S)        : Donald I. Hirsch It is certified that error appears in the above-identified patent and that said Letters Patent is hereby corrected as shown below:

Column 2
Line 4: delete " it's " and insert -- its -- therefore.

Column 2
Line 11: delete " bearings. " and insert -- bearing. -- therefore.

Column 4
Line 1: delete "seament" and insert -- segment -- therefore.

Signed and Sealed this

Twenty-fourth Day of July, 2007

JON W. DUDAS
*Director of the United States Patent and Trademark Office*